W. FERRIS.
DETENT.
APPLICATION FILED FEB. 23, 1918.

1,296,787.

Patented Mar. 11, 1919.

Witness.
Edward T. Wray.

Inventor.
Walter Ferris.
by Parks & Carter
Attorneys.

UNITED STATES PATENT OFFICE.

WALTER FERRIS, OF MILWAUKEE, WISCONSIN, ASSIGNOR TO BUCYRUS COMPANY, OF SOUTH MILWAUKEE, WISCONSIN, A CORPORATION OF WISCONSIN.

DETENT.

1,296,787.          Specification of Letters Patent.      Patented Mar. 11, 1919.

Original application filed March 1, 1917, Serial No. 151,859. Divided and this application filed February 23, 1918. Serial No. 218,743.

*To all whom it may concern:*

Be it known that I, WALTER FERRIS, a citizen of the United States, residing at Milwaukee, in the county of Milwaukee and State of Wisconsin, have invented a certain new and useful Improvement in Detents, of which the following is a specification, the same being a divisional application of Serial No. 151,859, filed March 1, 1917.

My invention relates to improvements in detents such as may be used in connection with jib hoists and automatic interlocking devices for locomotive cranes but is equally well adapted for use under many other circumstances.

My invention, therefore, has for one object to provide a detent or automatic stop which will be normally always in working relation with the ratchet wheel. Another object is to provide a detent which cannot be thrown off by sudden pressure or spinning of the ratchet wheel, a detent which will be yieldingly moved toward and from the ratchet wheel and a part of which will always be in operative relation except when positively withdrawn by the operator.

Like parts are indicated by like letters in all the figures.

A is a supporting frame. Rotatably mounted in it is a shaft $A^1$. Rotatably mounted on the shaft is a drum $A^2$. Keyed to this drum is a ratchet wheel $A^3$. $A^4$ is a clutch housing containing a clutch not shown whereby the shaft which is rotated by any suitable source of power not here shown may be connected or disconnected to the drum and ratchet wheel. $A^5$ is a lever whereby the clutch may be controlled by the operator.

The ratchet wheel is provided with a plurality of teeth B having curved forward detent engaging surfaces $B^1$ and curved rearwardly extending surfaces $B^2$ each surface terminated at and merged in a cylindrical bearing surface $B^3$. $B^4$ is an eccentric bearing disk mounted for rotation eccentrically on the pin $B^5$ and yieldingly thrust forward and held against rotation by the plunger $B^6$ slidable in a lug $B^7$ and held in the outer or forward position by a compression spring $B^8$. $B^9$ $B^{10}$ are dogs rotatably mounted side by side on the eccentric disk $B^4$. These dogs are adapted to engage the ratchet wheel.

Figure 2:
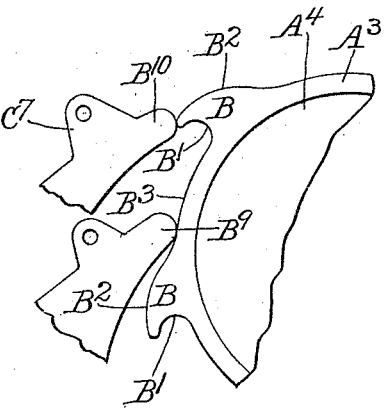
Fig. 2 is a side elevation on an enlarged scale showing a detail of the detent.

The dog $B^9$ is shorter than the dog $B^{10}$ and they are so positioned that only one of them can engage one of the holding teeth $B^1$ at the same time and when one of them is in engagement with one of said holding teeth then the other will rest upon the cylindrical surface $B^3$ and their relative distance apart is such that when one of them is caught on the point of one of the teeth as shown in Fig. 2 the other will just rest on the cylindrical surface so that if for instance $B^{10}$ slips off $B^9$ will not be flung out or not be caught in the air but will be right against the cylindrical surface and as the ratchet wheel turns the tooth $B^1$ will engage the dog $B^9$ and since that tooth has a curved surface it will hold the dog down and there will be no possibility of its jumping out and permitting the load to escape.

Figure 1:
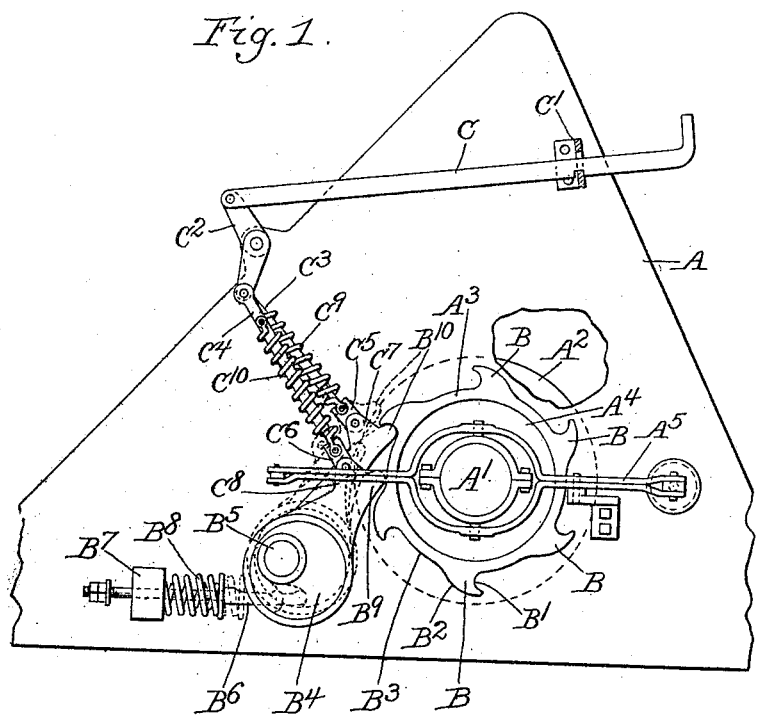
Figure 1 is a side elevation of a part of a crane featured in my device.

C is a hand link slidable in the guide $C^1$ and notched to engage the guide for engagement and control of the ratchet by the operator. This link is pivoted on one end of the bell crank lever $C^2$. The other end of the bell crank lever has pivoted to it the two thrust bars $C^3$ $C^4$ slidable each in a socket $C^5$ $C^6$ pivoted on the lugs $C^7$ $C^8$ on the dogs $B^{10}$ $B^9$. $C^9$ $C^{10}$ are springs interposed between the bars $C^3$ $C^4$ and the blocks $C^5$ $C^6$ whereby there is a yielding operating connection between each of the dogs and the hand control and when in the position shown in Fig. 1 these two springs are compressed and tend to hold the dogs down against the ratchet.

It will be evident that while I have shown in my drawings an operative device, still many changes might be made both in size, shape and arrangement of parts without departing materially from the spirit of my invention and I wish therefore that my invention be regarded as in a sense diagrammatically.

The use and operation of my invention are as follows:—

With the hand control in the position shown the clutch can be put in operation to rotate the drum and the dogs will pass over the tooth on the ratchet wheel in the usual manner first one and then another sliding over the inclined back side of the tooth and dropping down against the cylindrical surface. The fact that the dogs are so spaced that there never is a time when one of them is not against the inner cylindrical surface and therefore in line with a tooth makes it perfectly sure that no matter when the clutch be disengaged or no matter what happens one of these dogs will stop rotation of the ratchet wheel and the parts associated with it.

The holding dogs are mounted on a large eccentric which in turn is mounted on the stud rigidly set in the side frame. When either of these dogs carries a load the reaction will pass through the center of the eccentric as indicated and pointed out. This tends to turn the eccentric point on the stud and this turning tendency is resisted by a buffer spring which is preferably provided with a lighter auxiliary spring having a greater free length than the main spring. The primary purpose of mounting the dogs on the eccentric reacting against the buffer spring is to form a yielding abutment to absorb shocks received through the ratchet wheel.

In applying the interlocking device to this part of the mechanism the cam shaped projecting lug upon the eccentric, it will be noted, is located in such a position that where there is no reaction or no unusual load carried by either pawl, the buffer spring will push the eccentric around to this no load position so that the cam shaped locking lug crosses the path of the lower shoulder on the sliding bar and this prevents any outer movement of the bar, and therefore prevents disengagement of the clutch. The purpose of the light spring with the long travel is to get such positive and ample movement of the interlocking lug when the load carried by the pawls is at a minimum or merely due to the weight of the jib sufficient to insure a proper interlocking because the heavier stiffer spring might very easily not travel a sufficient distance to provide a positive and definite interlock.

The dogs may be withdrawn from engagement with the ratchet by the reach rods and levers as indicated, the peculiar features of these dogs being that the reach rods while pivoted to the lever are slidable in the pivotal heads so that they may thrust the dogs inwardly by a positive connection but slide outwardly away from the dogs when moved in the opposite direction. However, when so moved they cause the exertion of a tension in the coil springs tending yieldingly to draw the dogs outwardly. When it is desired to withdraw the dogs from engagement with the ratchet the operating lever or connecting arm is moved to the right rotating the short lever, drawing up on the reach rod and exerting a tension in the springs. Either pawl will, of course, immediately draw away from the rod, the other one being held by the load on the rod will not be free to move, but since power is applied and the drum is rotated in a clockwise direction, the dog will be released and the spring will instantly draw it away from the ratchet teeth. A possibility of accident lies in the possible engagement of one of the dogs with the overhanging end of a corresponding ratchet tooth in such a position that it may slip off and thereby drop the load. This possibility and the provision against such an accident is made clear in Fig. 2. It will be seen that the profile of the ratchet wheel is such that the arc between two teeth is divided into halves, the periphery through one half of the arc being circular, and the remaining half gradually rising to the height of the ratchet tooth. This circular periphery is at the minimum radius of the root of the tooth and it is obvious from inspection that when either one of the dogs is either engaged fully or partially with a ratchet tooth, the other is lying against the surface of minimum radius and in position of engagement, although removed by one half of a tooth pitch from the tooth with which it would next engage. Therefore if one dog should slip out the other would immediately engage with the same tooth of the ratchet wheel from which the first had slipped as soon as the ratchet wheel had revolved through one half of the tooth pitch. This happens no matter which dog slips. If it is the upper dog the lower one will catch on the same tooth as the ratchet wheel comes around. If it is the lower dog that first engages, the upper will catch on the next tooth as it comes around so there is no possibility of a slip getting away from both these dogs under any circumstances.

I claim:—

1. In a detent motion, a ratchet wheel, a pawl engaging said ratchet wheel, means for keeping it in such engagement, and a yielding operating member which may be set to cause withdrawal of the pawl when load is relieved therefrom.

2. In a detent gear, a ratchet wheel, and two staggered pawls coacting therewith, the profile of the ratchet teeth being so formed that the points of both pawls can simultaneously occupy the position of minimum radius.

3. In a detent gear, a ratchet wheel and two pivoted pawls engaging therewith so as to divide the ratchet tooth pitch, the pawls being so formed that if one should slip out of engagement the other is already in position for engagement without further revolution upon its pivot.

4. A detent comprising a ratchet wheel having a plurality of teeth projecting outwardly therefrom cylindrical surfaces intermediate said teeth nearer the center of rotation than the effective dog engaging tooth surface, two tooth engaging dogs arranged adjacent one another and spaced angularly one from another the distance between the dogs being such that one of them can always be in register with one of the teeth and yielding means for holding said dogs against the wheel.

5. A detent comprising a cylindrical wheel and a plurality of teeth projecting outwardly therefrom holding dogs in opposition thereto and means for yieldingly forcing them against the wheel the distance between the dogs being such that one of them is always in line with a tooth, means for positively moving said dogs into and out of operative relation said means comprising a controlling rod a lever actuating it; the yielding means being rigidly attached to such rod.

6. A detent comprising a cylindrically surfaced wheel and a plurality of teeth projecting outwardly therefrom holding dogs in opposition thereto and means for yieldingly forcing them against the wheel the distance between the dogs being such that one of them is always in line with a tooth a yielding abutment upon which such dogs are mounted said abutment comprising an eccentric disk the dogs being rotatable about the center of the disk the disk itself being rotatable about an eccentric bearing.

7. A detent comprising a cylindrical wheel and a plurality of teeth projecting outwardly therefrom holding dogs in opposition thereto and means for yieldingly forcing them against the wheel the distance between the dogs being such that one of them is always in line with a tooth; a yielding abutment upon which such dogs are mounted said abutment comprising an eccentric disk the dogs being rotatable about the center of the disk the disk itself being rotatable about an eccentric bearing yielding means for resisting the rotation of such disk and holding the dogs against the bodily movement therewith.

8. A detent comprising a wheel and a plurality of teeth, projecting outwardly therefrom, holding dogs in opposition thereto, said dogs mounted on an eccentric bearing, yielding means operating against the eccentric bearing, and yielding means operating against the holding dogs, adapted to force them into engagement with the wheel.

9. A detent comprising a cylindrical wheel and a plurality of teeth projecting outwardly therefrom, holding dogs in opposition thereto, said dogs mounted on an eccentric bearing disk, yielding means operating against the eccentric bearing disk, and yielding means operating against the holding dogs, adapted to force them into engagement with the wheel.

10. A detent comprising a cylindrical wheel and a plurality of teeth projecting outwardly therefrom, holding dogs in opposition thereto, said dogs mounted on an eccentric bearing disk, yielding means operating against the eccentric bearing disk, and yielding means operating against the holding dogs, adapted to force them into engagement with the wheel, and additional means for positively moving the dogs into and out of engagement with the wheel.

11. A detent comprising a cylindrical wheel and a plurality of teeth projecting outwardly therefrom holding dogs in opposition thereto, said dogs mounted on an eccentric bearing disk, yielding means operating against the eccentric bearing disk, and yielding means operating against the holding dogs, adapted to force them into engagement with the wheel, and additional means for positively moving the dogs into and out of engagement with the wheel, comprising a controlling rod attached to the yielding means.

In testimony whereof I affix my signature, in the presence of two witnesses, this 13th day of February, 1918.

WALTER FERRIS.

Witnesses:
E. J. WILKIE,
WALTER PLEHN.

Copies of this patent may be obtained for five cents each, by addressing the "Commissioner of Patents, Washington, D. C."